Figure 1:
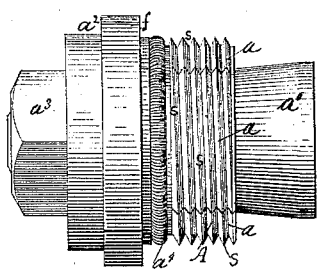

(No Model.)  3 Sheets—Sheet 1.

J. A. WHEELOCK.
DEVICE FOR TRUING MISSHAPEN HOSE COUPLINGS.

No. 284,107. Patented Aug. 28, 1883.

Witnesses:
Cahen Shaffer
Alex. Selkirk Jr.

John A. Wheelock
Inventor.
his Atty
Alex. Selkirk

N. PETERS, Photo-Lithographer, Washington, D. C.

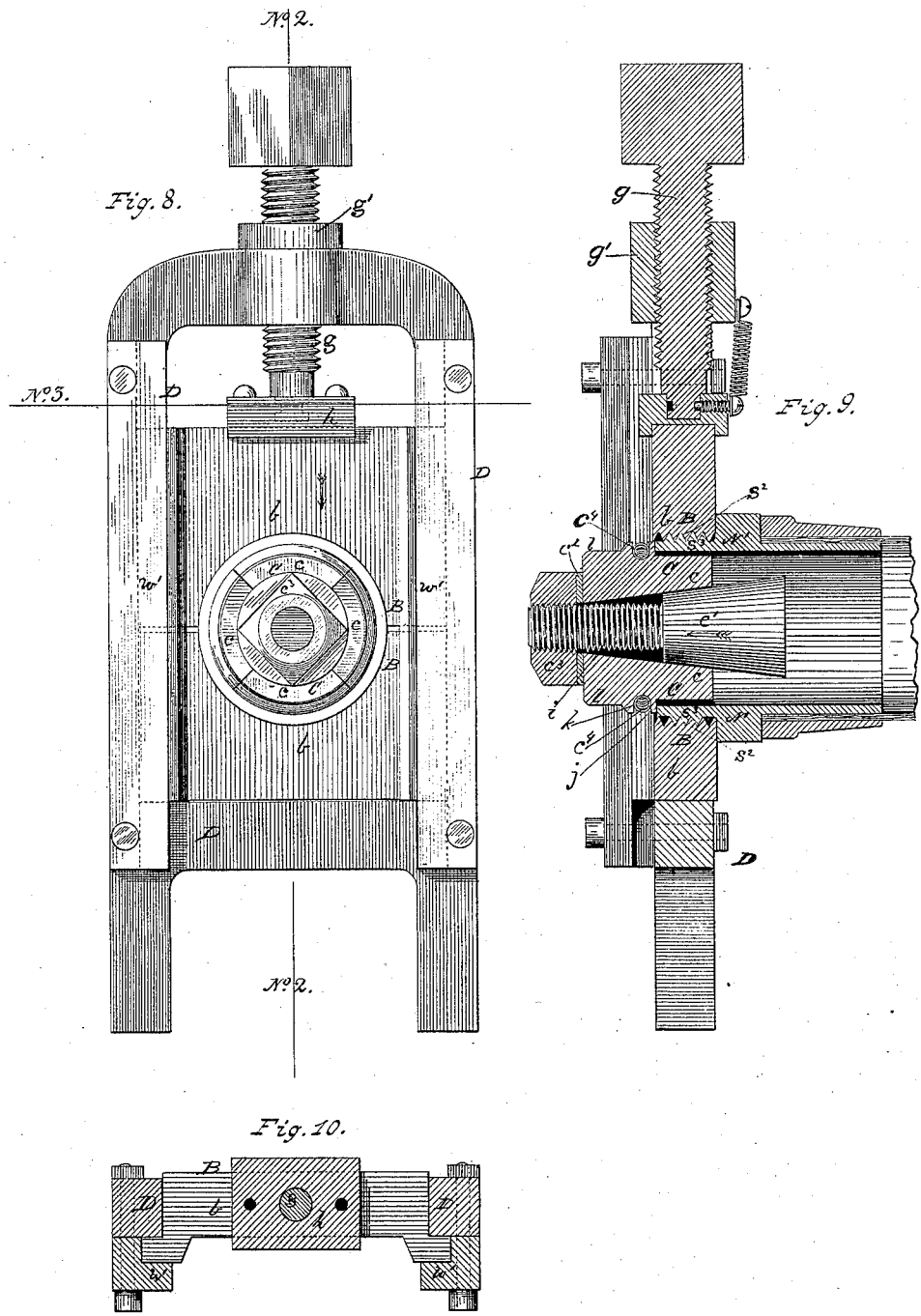

(No Model.)  3 Sheets—Sheet 3.
J. A. WHEELOCK.
DEVICE FOR TRUING MISSHAPEN HOSE COUPLINGS.
No. 284,107.  Patented Aug. 28, 1883.
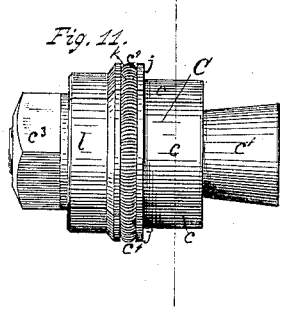
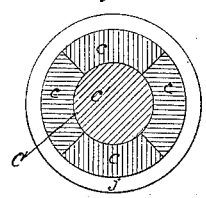
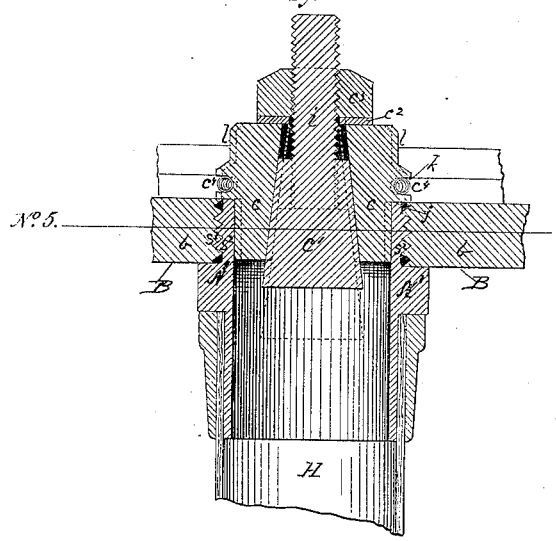
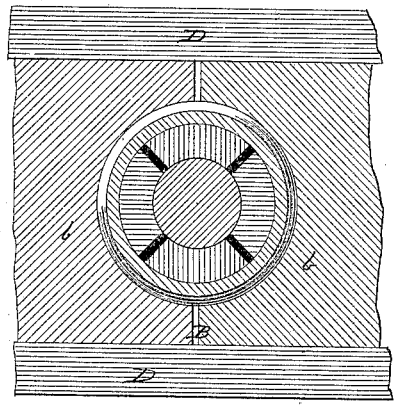

UNITED STATES PATENT OFFICE.

JOHN A. WHEELOCK, OF AMSTERDAM, NEW YORK, ASSIGNOR TO EVA E. WHEELOCK, PERRY KLINE, AND AUGUSTUS CLARK, ALL OF SAME PLACE.

DEVICE FOR TRUING MISSHAPEN HOSE-COUPLINGS.

SPECIFICATION forming part of Letters Patent No. 284,107, dated August 28, 1883.

Application filed July 10, 1883. (No model.)

*To all whom it may concern:*

Be it known that I, JOHN A. WHEELOCK, of Amsterdam, in the county of Montgomery and State of New York, have invented certain new and Improved Devices for Truing and Re-Forming Misshapen Sections of Hose-Couplings, of which the following is a specification.

Heretofore when the screw-nut and the male-screw sections of hose-couplings have become misshapen by their screw-threaded portions being bent out of a true circular form, so that their shape would not admit of their being screwed together, as originally intended, these misshapen sections, to be further serviceable were required to be re-formed. This has been accomplished by hand by using wooden mallets or other means, by which the material used would not be liable to indent or mar the metal of the coupling, and great labor and skill, as well as care, were required to so re-form or reshape the coacting portions of the sections as to make each fit the other even in a passable manner.

My invention relates to mechanism by the means of which the respective screw-threaded portions of the coupling-sections, when misshapen, will be readily restored to their original true circular forms, so that these coupling-sections may be as readily screwed together as when originally produced.

My invention in one part consists of a device for operating with the screw-nut portions of one of the sections of a hose-coupling to re-form any misshapen or bent form by means of an expanding sectional mandrel being forcibly applied to the internal screw-threaded surface of the nut portion of the coupling-section. In another part it consists of a device for operating with the male-screw portion of a hose-coupling to re-form any bent or misshapen portions of the same for its restoration to its original circular form, in which semicircular dies having screw-threaded surfaces are forcibly applied exteriorly to the male-screw-threaded portions of the coupling. In another part it consists of a device for operating with the male screw of a coupling-section for restoring to it its original circular form after being bent or misshapen, in which the surface of an expanding plain mandrel is applied interiorly to the inner surface of the bore of the male-screw portion of the coupling. In another part it consists in a device which will be adapted to receive the misshaped coupling-sections with their hose attached, and hold the same securely in a vertical position, for operations to be had therewith by the other devices employed to effect a restoration of the said coupling-sections to their original forms.

The object of my invention is to provide a simple and effective mechanism which may be expeditiously employed at a fire or elsewhere to restore to their original circular forms the nut-screw and male-screw portions of the sections of hose-couplings which have been injured by being flattened or bent from their original form, so that they may be made again serviceable and ready for reuse without any material delay. I attain this object by means of the mechanism illustrated in the accompanying drawings, in which there are fourteen figures, illustrating my invention, in all of which the same designation of parts by letters reference are used.

Figure 2:
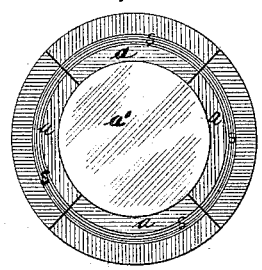
Figure 3:
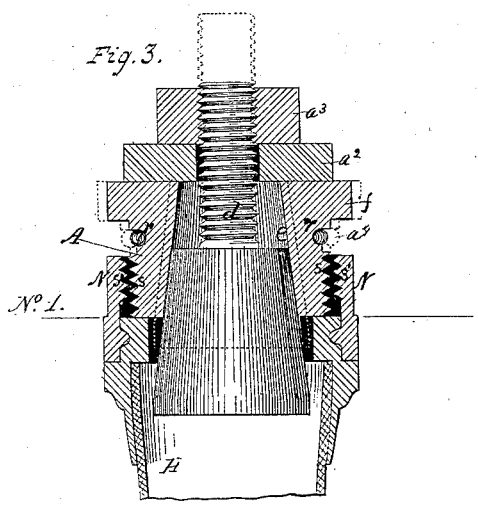
Figure 4:
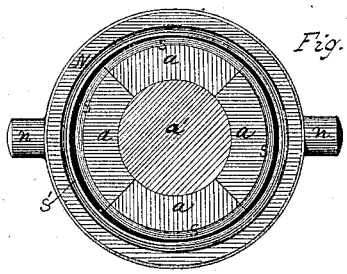
Figure 5:
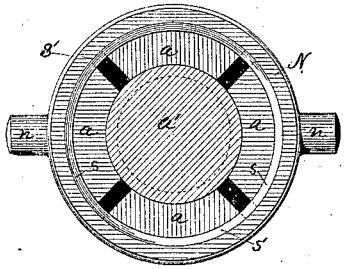
Figure 6:
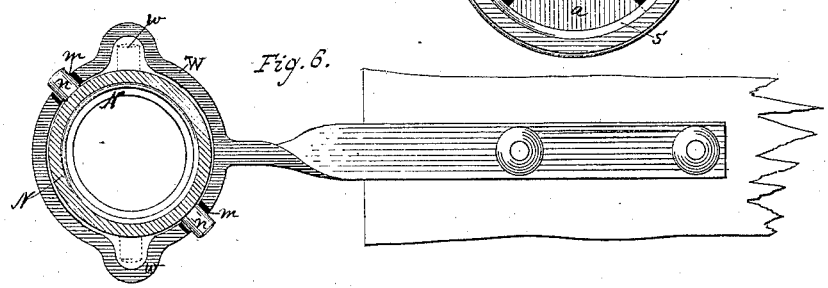
Figure 7:
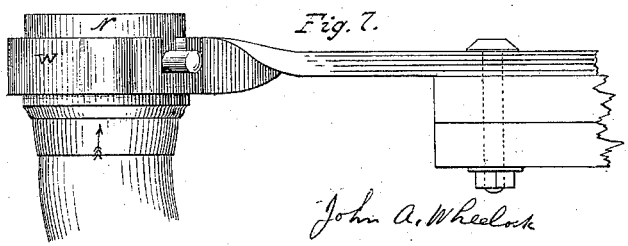

Referring to the drawings, Figure 1 represents a side elevation of the nut-truing mandrel. Fig. 2 is a view of the same from its rear end. Fig. 3 is a longitudinal sectional view of the same, illustrating the device applied to the nut-screw portion of a hose-coupling section. Fig. 4 is a view of the same from its rear end when in place in a misshapen nut-screw section of coupling to be re-formed, taken at line No. 1 in Fig. 3. Fig. 5 is a view taken at the same line of the same after the section has been re-formed. Fig. 6 is a view from above of the device employed for holding the misshapen coupling-section while being operated upon. Fig. 7 is a side elevation of the same. Fig. 8 is a front elevation of the device for re-forming the male-screw coupling-section with the misshapen coupling-section in place. Fig. 9 is a longitudinal sectional view of the same, taken at line No. 2, Fig. 8. Fig. 10 is a cross-sectional view of the device, taken at line No. 3, Fig. 8. Fig. 11 is a side elevation of an expanding plain mandrel which coacts with device shown in Fig. 8.

Fig. 12 is a view of same, taken at line No. 4, Fig. 11. Fig. 13 is a cross longitudinal sectional view of a misshapen male-screw coupling-section and the coacting devices shown in Figs. 8 and 11 applied to the same, and Figs. 14 is a front view of the same.

In the drawings, A represents the nut-truing mandrel, which is operated to re-form the bent original circles of the screw-threads of the portions of hose-couplings. This nut-truing mandrel is composed of mandrel-sections $a\ a\ a\ a$, two or more, core $a'$ for expanding said mandrel, supporting-shoulder washer $a^2$, draw-nut $a^3$, and elastic retaining-band $a^4$.

The mandrel-sections $a$ are each made the duplicate of the others, and are each provided with a section of a series of spiral or screw threads, $s$, corresponding in size and form with the screw-threads (presumed to be standard-sized threads) in the nut portion N of the coupling intended to be trued, as shown in Fig. 3. These sections are each provided with recess $r$, for receiving the elastic retaining-band $a^4$, and also with shoulder-flange $f$. They are shaped together at first, when in solid union, as an entire piece, with a diameter of screw-thread portion corresponding with that of the screw-threaded nut as it was originally made, so that it will be adapted to nicely fit with the same when in its original true circular form. This piece, as an entire whole, is then provided with a tapering central bore, $e$, having its greatest diameter at the rear end and gradually contracting as it extends forward, as shown in Fig. 3. After being thus formed, the piece is cut longitudinally and divided into thirds, quarters, sixths, or any other preferred fraction or number of sections. The drawings show four equal sections thus produced. The cutting or kerf reduces the diameter of the sections $a\ a$ as a whole, so that they are easily introduced into a misshapen coupling.

The expanding-core $a'$ is made of steel, and with a tapering form, which will correspond with the taper of bore $e$ of mandrel A, so as to permit sections $a$ of the same to contract their diameter when the core is relatively more rearward within said bore, and expand the same to its original diameter when the core is drawn forward. Made solid with or securely connected with core $a'$ is the screw-threaded stem $d$, on which works draw-nut $a^3$. If preferred, the expanding-core $a'$ may be centrally pierced and cut with a screw-thread, and a screw-threaded stem, made with corresponding diameter and form of thread and provided with a nut form of head, may be substituted for the screw-threaded stem $d$ and draw-nut $a^3$, for the purpose of drawing the core inward and expanding the sections of the mandrel.

The supporting-shoulder washer $a^2$ consists of a stiff piece of metal centrally pierced and placed between the shoulder-flanges $f$ and draw-nut $a^3$, (or nut-head of a draw-bolt.) The sole functions of this washer are to support the draw-nut at one side and the end of the sectional mandrel at the opposite side, and allow the flanged ends of the sections to move outward on its surface when they are being expanded. If the nut acted directly upon the ends of the sections $a\ a$, these being independent of and disconnected from each other, in order to permit of a bodily sidewise or outward movement of each, the twisting motion of the nut would tend to throw the threads of the sections out of line with each other, and thus, when compressed by the mandrel against the threads of the nut-section of the coupling, the sections would injure the threaded portion of the said section of the coupling; hence the importance of the washer and of the separation of the sections $a\ a$ from each other.

When a misshapen nut portion, N, of a coupling is to be operated upon for re-forming the same and restoring to it its original true circular form of screw-thread, the sections $a$ of mandrel A will be contracted, as shown in Fig. 4, when the operator will introduce the screw-threaded portions of the mandrel into the screw-threaded cavity of nut N, as illustrated in Fig. 4, with the screw-threads $s$ of sections $a$ fitting with the screw-threads $s'$ of the nut. He will then, with a wrench or other suitable instrument, revolve draw-nut $a^3$ in direction to draw the expanding-core $a'$ forward and inward, and thereby force sections $a\ a$ of the mandrel outward until all the misshapen portions of the nut-screw have been fully forced to assume their form of original true circle. The operator will then reverse the direction of revolution of the draw-nut and force the expanding-core back, so as to allow the sections of the mandrel to be contracted, when the mandrel will be readily removed from the nut. The recess $r$, made in the sections $a$ of the mandrel, operates with the elastic band $a^4$ to hold the sections from shifting endwise, so that the series of threads on one section will be relatively opposite to those of its neighboring section.

To enable the operator to readily and conveniently operate upon the nut portion of the coupling without disconnecting the hose H from the same, I provide a stationary coupling-wrench, W, Figs. 6 and 7, which wrench is made, in its main portion, with a circular form, and with an inside diameter a little greater than the outside diameter of the coupling-nut it is to hold. At two opposite points in the wrench are formed laterally-projecting recesses $w\ w$, having a sufficient length of outward extension for the circular line of the wrench as to permit the holding ears or lugs $n\ n$ of the nut to readily pass with the coupling-nut through this wrench from its lower side upward, as indicated by arrow in Fig. 7. In the upper side of the receiving-rim of this wrench are made vertical recesses $m\ m$, into which the ears or lugs $n\ n$ of the coupling-nut may enter and be held when the coupling-nut has been passed through the wrench and partly turned and lowered. This wrench is provided with a stiff arm, which is pierced to receive bolts or screws for its attachment to the timber of a bench. By means of this stationary wrench the nut portion of the coupling will be securely held in a vertical position, so that the operator will be enabled to readily insert mandrel A in place and operate the same.

For truing the male screw of the opposite and coacting section of the coupling, I employ a re-forming screw-threaded die, B, and a plain truing-mandrel, C, the former to operate with the exteriorly-screw-threaded portion of the coupling-section and the latter with the plain interior or bore of the same.

The essential parts of the re-forming screw-die B are the sectional dies $b\,b$, which dies have their oppositely-facing and coacting ends made each with a semicircular recess of a diameter corresponding with the male screw of the coupling to be operated upon, and have cut in their faces a screw-thread, $s^2$, which will correspond with threads $s^3$ of the male coupling-screw N', which (in most cases) is made with standard screw-threads, and mechanism for operating the same, to force one section toward the other when the male-screw section of the coupling is in place between them. The threads cut upon the faces of the dies B are of uniform depth and curvature throughout their lengths, in order that, unlike an ordinary screw-cutting die, no marring, cutting, or indentation of the threads in the coupling-section shall occur. The drawings show the sections $b\,b$ of die B set in a frame, D, with one of the sections (the lower one) stationary and the other movable, working in ways $w'\,w'$. Employed with these dies is the forcing-screw $g$, preferably made of steel, passing through a screw-threaded nut, $g'$, made solid with the head end of frame D, and having its lower end bearing on block $h$, (also made of steel,) which block is secured to the outer end of the movable die by screws or bolts. The lower end of screw $g$ is finished with a grooved journal, which is keyed in a central circular hole made in block $h$, so as to permit the same to turn freely, while at the same time it will be held in said block and be adapted to draw on the same and move the movable die from the stationary one when the screw $g$ is revolved in proper direction. This forcing-screw is also provided with a squared or other form of head, which will engage with a wrench for operation to revolve the screw for forcing the movable die toward the stationary one, and by a reverse operation draw the former away from the latter.

The plain truing-mandrel C, in its essential parts, is composed of the plain mandrel-sections $c\,c\,c\,c$, two or more. The expanding-core $c'$ is made with a tapering form, which gradually contracts from its largest diameter at its rear end to the screw-threaded stem $i$, the supporting-washer $c^2$, the draw-nut $c^3$, and the elastic retaining device $c^4$. The mandrel-sections $c\,c\,c\,c$ are each made the duplicate of the other, with their mandrel portions formed with a plane surface in the form of sections of a plane cylinder, and have solid flange-shoulders $j$, recess or groove $k$, and extension portions $l$, by which the operator will hold the mandrel when placing or withdrawing the same. These mandrel-sections $c$ and the associated portions therefor are shaped, when in a solid or single piece, so as to form an entire whole. They are formed with a tapering central bar, $m$, corresponding with the taper of the expanding-core $c'$. After being thus formed in a single piece, these mandrel-sections are produced by dividing the piece into fractions, as thirds, quarters, sixths or other fractional parts.

In operating with the male section N of the coupling the said coupling is introduced into the stationary wrench W in the manner substantially as before described. The die B, having had its sections $b\,b$ parted from each other, is then placed in position, with the sections $b\,b$ surrounding the male screw of the coupling-section, with the screw-threads $s^2$ of the dies setting into screw-threads $s^3$ of coupling N', when the movable die will be crowded toward the stationary die, so as to pinch on the male screw. The operator will then introduce the plain expanding-mandrel C into the bore of the coupling-section, with the sections $c\,c$ of the mandrel entering the bore until stopped by the flange-shoulder $j$, having bearing on the end surface of the male screw, when the operator, with a wrench, will operate draw-nut $c^3$ and draw the expanding-core $c'$ inward, so as to distend the mandrel-sections $c\,c\,c\,c$. By alternately operating screw $g$ of the re-forming die B and the draft-nut $c^3$, the dies $b\,b$ will be gradually forced toward each other and reduce the uneven outer circular line of the screw $s^3$ of coupling-section N' to a true circular form, while the expanding of sections $c\,c$ of mandrel C will operate to impart to the inner surface of the bore of the coupling a true cylindrical shape, and by the coaction of the two machines—the die B on the outer screw-threaded surface of coupling-section N' and the mandrel C on the inner plain surface of the same—the male-screw end of the said section will be gradually re-formed and trued to a true circular form, the same as when originally made.

By the successive use and operations of nut-screw-truing mandrel A with a misshapen-nut section N of the coupling, and that of the joint use and operation of truing-die B and plain truing-mandrel C with a corresponding misshapen male-screw section, N', of the coupling, the said two misshapen parts of the coupling will be re-formed into true circular forms, the same as when originally made. The coacting sections of the screws of the couplings will be made to as nicely fit and screw into each other as when originally made.

It sometimes occurs that a new section of a coupling is to be used with an old section, and, though both be made with standard screw-threads, they will not be readily screwed together, for the reason that the screw-threaded male portion is slightly larger than the screw-nut portion. In such a case the screw-threaded nut-truing mandrel may be employed to slightly expand the nut-section of the coupling, so that it will be made to nicely fit and readily receive the male-screw portion of the coupling. In other cases the nut-section of the coupling is sometimes slightly larger than the coacting male section, so that the two sections will screw too freely together. In such a case the male section may be readily enlarged to fit the nut-section by means of the plain truing-mandrel C.

If preferred, the sections b b of re-forming die B may be operated by a lever or other mechanism, which will be adapted to crowd these sections of the die toward each other and move them apart as may be required.

I am aware that expanding-mandrels and other similar tools have heretofore been constructed in sections, in some cases held together by rubber bands located at their ends, and provided with means for expanding the same to fit the interior surfaces of annular objects, to hold the same and to enlarge the bore of the same, and I do not claim such as of my invention.

Having described my invention, what I claim, and desire to secure by Letters Patent, is—

1. In a mechanism for truing the nut-sections of hose-coupling, the combination, with two or more independent screw-threaded mandrel-sections, a, having a tapering central bore, an expanding-core, a', and mechanism for forcing or drawing said core within the said screw-threaded mandrel-sections at the will of the operator, whereby the screw-threaded mandrel-section will be made to re-form a misshapen screw-nut of a coupling, as set forth.

2. In a machine for truing the male-screw section of a hose-coupling, the combination, with die B, formed of sectional dies having each a recess, the face of which is provided or formed in screw-threads of uniform pitch, depth, and curvature, of mechanism to force said die-sections toward each other for simultaneous operations upon the male-screw sections of the coupling, as set forth.

3. A mechanism for use in truing misshapen male-screw sections of a hose-coupling, consisting of the combination of the die-sections b b, having threads of uniform depth, pitch, and curvature, holding and guiding frame, and mechanism to force the dies toward each other, whereby the dies will be adapted to operate with the said misshapen screw-sections of the coupling for re-forming the same into true circular form, as set forth.

4. A mechanism for use in truing misshapen male-screw sections of a hose-coupling, consisting of the combination of die-sections b b, provided with oppositely-located circular recesses, having a series of screw-threads of uniform pitch, depth, and curvature on their faces, a holding and guiding frame having a nut made at an end thereof opposite the movable die, and a forcing-screw, g, substantially as for operations set forth.

5. The means for truing the misshapen male-screw-thread sections of couplings, consisting of the combination of screw-threaded semicircular recessed dies, having a frame for their holding and guidance, and mechanism for forcing the die-sections together, with mandrel composed of sections which are adapted to expand by mechanism, whereby the said section of the misshapen coupling will be trued by their joint operations, substantially in the manner set forth.

6. The stationary wrench or coupling-section holder W, made with lateral recesses in two opposite side portions, and provided with vertical holding notches or recesses w w in the sides thereof, and having an arm for attachment to a fixed piece, whereby a section of a hose-coupling may be placed in position and be securely held while being operated with for restoration to their original form.

JOHN A. WHEELOCK.

Witnesses:
W. DAVIDSON JONES,
PERRY KLINE.